(12) United States Patent
Bowron

(10) Patent No.: US 8,863,444 B2
(45) Date of Patent: Oct. 21, 2014

(54) ASSEMBLY SYSTEM FOR MODULAR BUILDING UNITS

(75) Inventor: Julian Bowron, Toronto (CA)

(73) Assignee: Feature Walters, Toronto (CA)

( * ) Notice: Subject to any disclaimer, the term of this patent is extended or adjusted under 35 U.S.C. 154(b) by 0 days.

(21) Appl. No.: 13/112,246

(22) Filed: May 20, 2011

(65) Prior Publication Data

US 2012/0047821 A1 Mar. 1, 2012

Related U.S. Application Data

(60) Provisional application No. 61/349,934, filed on May 31, 2010.

(51) Int. Cl.
| | | |
|---|---|---|
| *E04B 1/346* | (2006.01) |
| *E04B 7/16* | (2006.01) |
| *B60G 1/00* | (2006.01) |
| *E04B 1/348* | (2006.01) |
| *B62D 33/02* | (2006.01) |
| *E04B 1/35* | (2006.01) |

(52) U.S. Cl.
CPC *B62D 33/02* (2013.01); *B60G 1/00* (2013.01); *E04B 1/34815* (2013.01); *E04B 1/355* (2013.01); *E04B 1/34838* (2013.01)
USPC .................................. 52/69; 52/79.5; 52/143

(58) Field of Classification Search
USPC .......................... 52/69–71, 79.5, 143, 745.19; 16/387–392
See application file for complete search history.

(56) References Cited

U.S. PATENT DOCUMENTS

| | | | |
|---|---|---|---|
| 1,637,129 A | 7/1927 | Pritchett | |
| 2,663,375 A | 12/1953 | Caldwell | |
| 2,834,599 A | 5/1958 | Sarchet | |
| 3,109,640 A | 11/1963 | Schneckloth | |
| 3,653,680 A | 4/1972 | Denny | |
| 3,754,361 A | 8/1973 | Branham et al. | |
| 3,759,409 A * | 9/1973 | Wenzel et al. | 414/460 |

(Continued)

FOREIGN PATENT DOCUMENTS

| | | |
|---|---|---|
| CA | 1268017 A1 | 4/1990 |
| CA | 2168258 A1 | 7/1994 |

OTHER PUBLICATIONS

Canadian Intellectual Property Office, Office Action for CA Application No. 2,741,750, mailed Sep. 8, 2011, 2 pages.

(Continued)

*Primary Examiner* — Brian Glessner
*Assistant Examiner* — Brian D Mattei
(74) *Attorney, Agent, or Firm* — Alston & Bird LLP

(57) ABSTRACT

An assembly system for modular building units having a floor and a plurality of walls is provided. The assembly system includes a floor platform, a plurality of wall platforms, and a plurality of hinge assemblies. Each of the plurality of hinge assemblies may be rotatable to at least a first position and a second position when attached to the floor and the one of the plurality of walls. In the first position, the walls and the floor are generally parallel while in the second position the wall and the floor are generally perpendicular. Methods of use are also provided, in which, during use, the hinge assembly of the system may be rotated from the first position to the second position at least in part by moving the walls in an upwards direction relative to the floor.

8 Claims, 18 Drawing Sheets

(56) References Cited

U.S. PATENT DOCUMENTS

| | | | |
|---|---|---|---|
| 3,779,573 A | | 12/1973 | H:son Gullberg et al. |
| 3,829,115 A | | 8/1974 | Rich |
| 3,855,744 A | | 12/1974 | Miram |
| 3,924,544 A | | 12/1975 | Grau et al. |
| 4,154,436 A | | 5/1979 | Sellers |
| 4,240,646 A | * | 12/1980 | Scott ........................... 280/30 |
| 4,397,476 A | | 8/1983 | Bolyard et al. |
| 4,504,076 A | | 3/1985 | Bedney |
| 4,534,141 A | * | 8/1985 | Fagnoni ........................ 52/68 |
| 4,796,350 A | | 1/1989 | French |
| 4,891,919 A | * | 1/1990 | Palibroda ..................... 52/79.5 |
| 5,118,245 A | | 6/1992 | Dunkel |
| 5,249,823 A | | 10/1993 | McCoy et al. |
| 5,362,083 A | | 11/1994 | Emanuele et al. |
| 5,414,918 A | | 5/1995 | Pearson |
| 5,542,653 A | | 8/1996 | Maloney |
| 5,596,844 A | * | 1/1997 | Kalinowski ................... 52/79.5 |
| 5,629,171 A | | 5/1997 | Conder et al. |
| 5,722,809 A | | 3/1998 | Urbank |
| 5,761,854 A | * | 6/1998 | Johnson et al. ............... 52/69 |
| 5,800,117 A | | 9/1998 | Milton |
| 5,822,930 A | * | 10/1998 | Klein ............................ 52/143 |
| 5,832,670 A | * | 11/1998 | Bennett ........................ 49/382 |
| 5,890,687 A | | 4/1999 | Pryor et al. |
| 5,966,956 A | * | 10/1999 | Morris et al. ................ 62/259.1 |
| 6,067,771 A | | 5/2000 | Blankenship |
| 6,419,245 B1 | | 7/2002 | Trimble |
| 6,601,860 B2 | | 8/2003 | Potter |
| 6,969,054 B2 | | 11/2005 | Sueme et al. |
| 7,017,923 B1 | | 3/2006 | Holman |
| 7,086,209 B1 | | 8/2006 | Pruitt et al. |
| 7,175,205 B2 | | 2/2007 | Simpson |
| 7,559,147 B2 | | 7/2009 | Fleeman |
| 2003/0197352 A1 | | 10/2003 | Bordeleau et al. |
| 2005/0034379 A1 | * | 2/2005 | Smirnov et al. ................ 52/69 |
| 2007/0262567 A1 | | 11/2007 | Benson et al. |
| 2008/0093827 A1 | | 4/2008 | Silberberg |
| 2009/0179395 A1 | | 7/2009 | Morris et al. |
| 2009/0217600 A1 | * | 9/2009 | De Azambuja ............... 52/79.5 |
| 2010/0135757 A1 | | 6/2010 | Welch et al. |

OTHER PUBLICATIONS

Applicant Response dated Nov. 2, 2011 to CA Office Action, mailed Sep. 8, 2011, for CA Application No. 2,741,750, 3 pages.
Canadian Intellectual Property Office, Office Action for CA Application No. 2,741,750, mailed Dec. 30, 2011, 3 pages.
Applicant Response dated Feb. 15, 2012 to CA Office Action, mailed Dec. 30, 2011, for CA Application No. 2,741,750, 7 pages.
Canadian Intellectual Property Office, Office Action for CA Application No. 2,741,750, mailed Apr. 4, 2012, 2 pages.
Applicant Response dated Jul. 4, 2012 to CA Office Action, mailed Apr. 4, 2012, for CA Application No. 2,741,750, 3 pages.
Canadian Intellectual Property Office, Notice of Allowance for CA Application No. 2,741,750, mailed Sep. 7, 2012, 1 page.
United States Patent and Trademark Office, Office Action for U.S. Appl. No. 13/676,986, dated Feb. 8, 2013, 9 pages, USA.

* cited by examiner

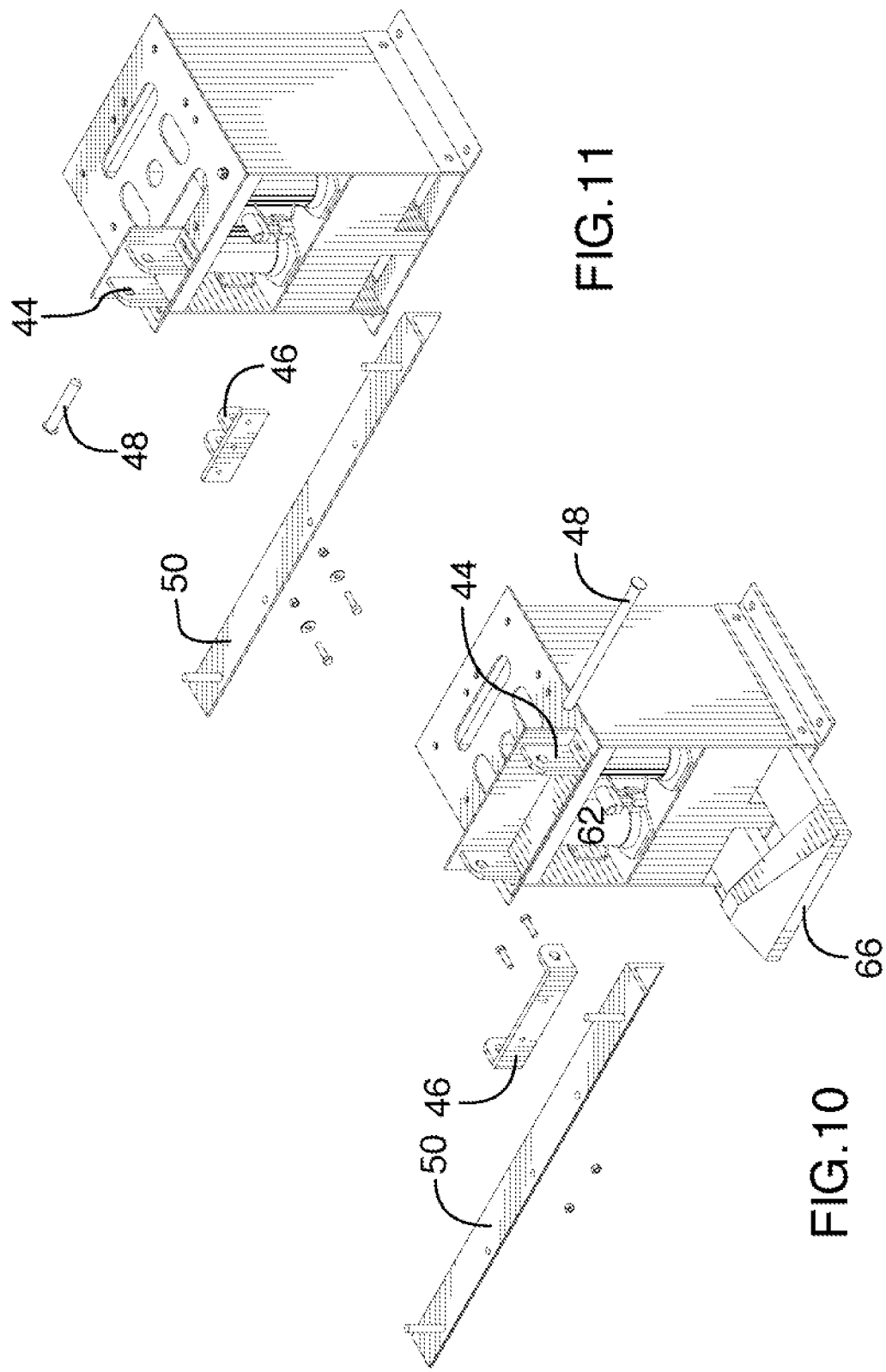

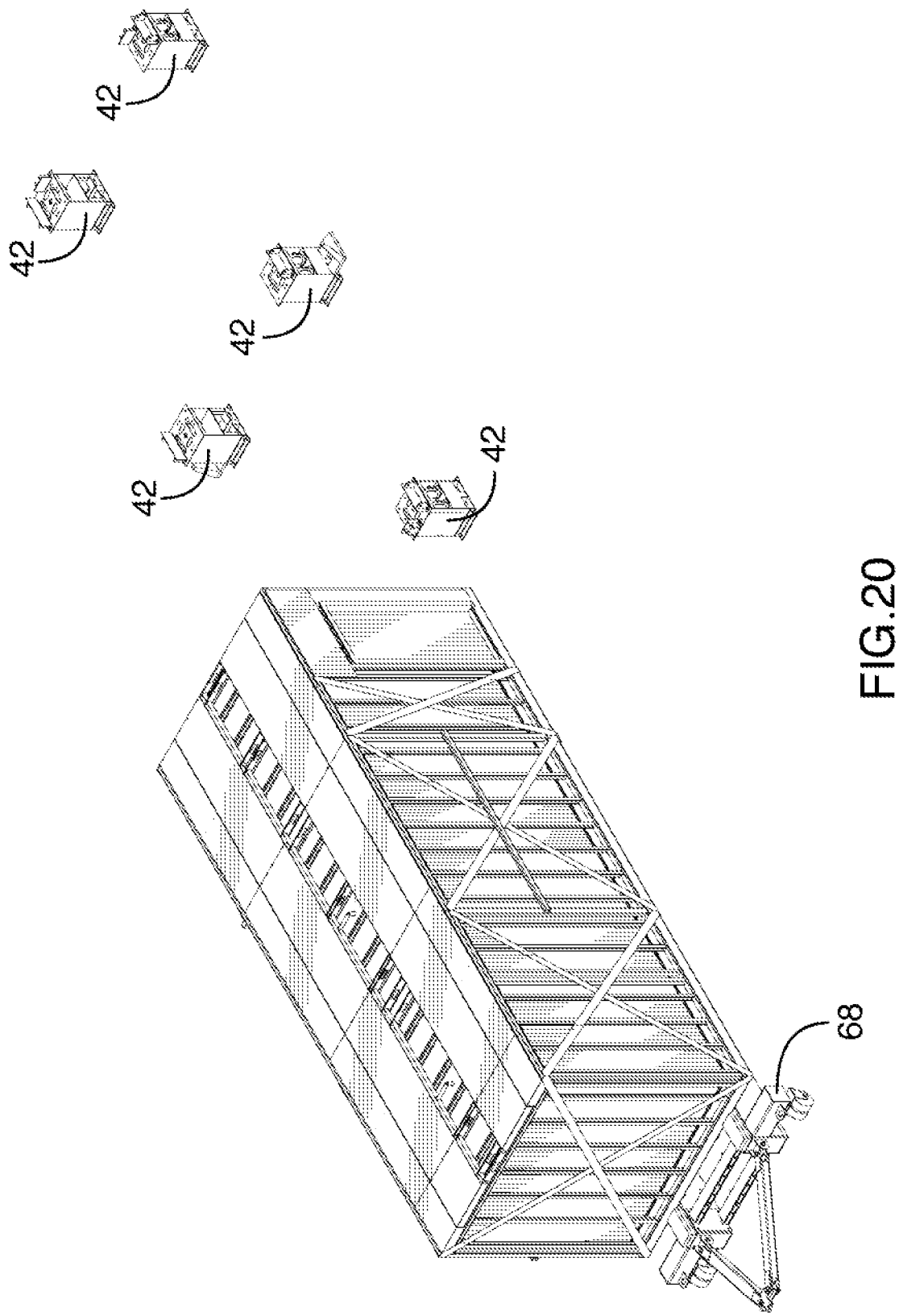

ASSEMBLY SYSTEM FOR MODULAR BUILDING UNITS

CROSS-REFERENCE TO RELATED APPLICATIONS

This application claims priority to U.S. Provisional Application No. 61/349,934, filed May 31, 2010, entitled Assembly System for Modular Building Units, which is incorporated herein in its entirety by reference.

BACKGROUND

The invention relates to a method of and means for prefabricating building structures. The structures are prepared from a module or modules comprising a floor panel and depending wall panels. The floor panel and wall panels are prefabricated on a tip up and jig system, and assembled into a floor and walls through hinge joinder means. The hinge joinder means may be removed from the pre-fabricated structure once the walls are in the desired position (generally perpendicular to the floor).

Prefabricating building elements, such as a panel structure used as a floor, wall, or overhead structure of a building, or a pre-fabricated room having floors and walls, or walls and overhead structure, is well known in the art. Jigs for constructing such pre-fabricated building panels, are also known. Once such panels are fabricated, typically they must be individually placed in juxtaposition and interconnected with the other panels of the building module, either before or after the panels are in their final position in the structure. In order to accomplish the desired interconnection, the individual panels must be brought into registry and alignment thus requiring each panel to be individually moved and carefully adjusted in position with respect to the other panels. This is tedious and time consuming, and the accuracy of the prefabricated panel construction, as well as the accuracy of the alignment, is critical to the quality of a building.

Systems and methods for building pre-fabricated panels, and assembling them into modules or building structures, are known. U.S. Pat. No. 7,559,147 teaches a portable framing fixture for fabricating wall frames. U.S. Pat. No. 7,086,209 teaches a method of constructing, transporting and erecting buildings using a series of modular footer/leveling pads. U.S. Pat. No. 6,969,054 teaches a receiving stand for a frame stacking system used to stack prefabricated frames. U.S. Pat. No. 6,067,771 teaches a modular building using pre-fabricated component parts. U.S. Pat. No. 5,542,653 teaches a modular, portable framing table apparatus for facilitating the construction of wood frame structures. U.S. Pat. No. 5,414,918 teaches a framing jig for building various configurations of wall sections, roof trusses and the like. U.S. Pat. No. 4,796,350 teaches a jig comprising a support frame. U.S. Pat. No. 5,629,171 teaches a jig for assembling a prefabricated building wall or similar structure. U.S. Pat. No. 4,154,436 teaches a fabricating jig for building components such as walls horizontally. U.S. Pat. No. 3,109,640 teaches a table for assembling structural components such as trusses wherein the table can pivot through a range of substantially 180 degrees, so that the table or jig and the work carried thereon can be inverted so that what was once the under surface of the truss becomes the upper surface. U.S. Pat. No. 3,855,744 describes a method of pre-fabrication construction whereby the overhead (roof) and floor panels are prefabricated, attached together using a hinge element, and assembled by lifting the overhead panel. However, this type of construction requires very large and structural hinge joinder means, since the hinge joinder means needs to be able to support the entire wall structure, as the overhead structure is being lifted.

It would be desirable to have a method and system for building floor panels and wall panels and quickly and easily joining them and assembling them into a prefabricated structure.

BRIEF SUMMARY

According to one aspect of the present invention is provided an assembly system for modular building units having a floor and a plurality of walls, comprising: a floor platform, capable of supporting the floor; a plurality of wall platforms, each capable of supporting one of the plurality of walls; a plurality of hinge assemblies, each having a first end and a second end, the ends rotatable around a hinge, each of the hinge assemblies capable of attaching, on the first end, to the floor, and capable of attaching, on the second end, to one of the plurality of walls, the hinge assembly rotatable to at least a first position and a second position when attached to the floor and the one of the plurality of walls, wherein, in the first position, the wall and the floor are generally parallel, and in the second position, the wall and the floor are generally perpendicular; wherein, in use, the hinge assembly can be rotated from the first position to the second position by moving the walls in an upwards direction relative to the floor.

In certain embodiments, the assembly system further comprises a plurality of floor leveling apparatus capable of raising and lowering the floor platform relative to a surface on which the floor platform is situated.

In certain embodiments, the assembly system further comprises a plurality of pistons each driving a rod capable of displacing the floor relative to the floor platform when the floor is positioned on the floor platform.

In certain embodiments, the assembly system further comprises wheels on the wall platforms.

In certain embodiments, the hinge assembly extends an entire length of the floor.

In certain embodiments, the hinge assembly extends an entire length of the wall.

According to a further aspect of the present invention is provided a method for building a pre-fabricated modular building unit, comprising: (a) providing a floor support platform relatively parallel to the ground and capable of supporting a floor frame, the floor support platform having an upper surface and a plurality of upper edges; (b) fastening at least one hinge assembly to each of the upper edges; (c) building a floor frame onto the hinge assemblies; (d) providing a plurality of wall support platforms relatively parallel to the ground and capable of supporting a wall frame, the wall support platform having an upper surface; (e) building a wall frame onto the wall support platform; (f) attaching the edge of the wall frame to the hinge assembly; and (g) rotating the wall frame in an upwards direction by means of the hinge assembly so that the wall frame is positioned generally perpendicular to the floor frame.

According to a further aspect of the present invention is provided a method for building a pre-fabricated modular building unit, comprising: (a) providing a floor support platform relatively parallel to the ground and capable of supporting a floor frame, the floor support platform having a surface and a plurality of upper edges; (b) building a floor frame having a plurality of exterior edges; (c) fastening at least one of a plurality of hinge assemblies onto the exterior edges; (d) providing a plurality of wall support platforms relatively parallel to the ground and capable of supporting a wall frame, the wall support platform having an upper surface; (e) building a wall frame onto the wall support platform; (f) attaching the edge of the wall frame to the hinge assembly; and (g) rotating the wall frame in an upwards direction by means of the hinge assembly so that the wall frame is positioned generally perpendicular to the floor frame.

The wall support platforms may capable of movement relative to the ground and the method may comprise after step (e) and before step (f) a step of moving or situating the wall support platform proximally to the floor support platform so that an edge of the wall frame can be attached to the hinge assembly.

The method may comprise, after step (g), a step (h) rigidly securing the wall frame to the floor frame.

In certain embodiments, the method further comprises (j) removing the plurality of hinge assemblies.

In certain embodiments, the method further comprises (k) providing a plurality of apertures in the floor support platform, through each of which one of a plurality of rams each connected to a piston or a jack is capable of extending; and (l) extending the plurality of rams through the floor support platform, raising the floor frame relative to the floor support platform, by means of activating the piston or jack.

In certain embodiments, the method further comprises, at any time after the building of the floor frame, the building of a floor surface onto the floor frame.

In certain embodiments, the building of the floor surface comprises affixing a layer of plywood to the floor frame.

In certain embodiments, the building of the floor further comprises affixing to the layer of plywood a floor covering selected from the group consisting of a carpet, a tile surface, a hardwood surface, and a laminate hardwood surface.

In certain embodiments, the method further comprises, at any time after the building of the wall frame, and before the rotating of the wall frame in an upwards direction, the building of an inner wall surface onto the wall frame.

In certain embodiments, the inner wall surface comprises a layer of drywall affixed to the wall frame. Certain embodiments encompass painting or priming the layer of drywall, and/or affixing tiles to the layer of drywall.

The invention also teaches a wagon for moving a structure off one or more pairs of platforms, wherein the distance between a pair of platforms is a platform distance, the wagon comprising:

a support surface extending along a horizontal first axis, the support surface having a support breadth horizontal and perpendicular to the first axis, the support breadth being less than the platform distance; at least one rear wheel carrying the support surface and located within the support breadth; and at least one front wheel carrying the support surface, the front wheel extending outside of the support breadth on both ends of the support breadth.

The wagon may have a plurality of front wheels, at least one of the plurality of front wheels extending outside of the support breadth on both ends of the support breadth. The wagon may have a plurality of rear wheels.

BRIEF DESCRIPTION OF THE DRAWINGS

FIGS. 9-11 show various exploded views of the hinge region mounted to jack stand of FIG. 8.

FIGS. 15-20 shows a perspective view of the assembly system for modular building units with the wagon for moving the constructed unit, demonstrating the steps in series.

DETAILED DESCRIPTION OF VARIOUS EMBODIMENTS

Figure 1:
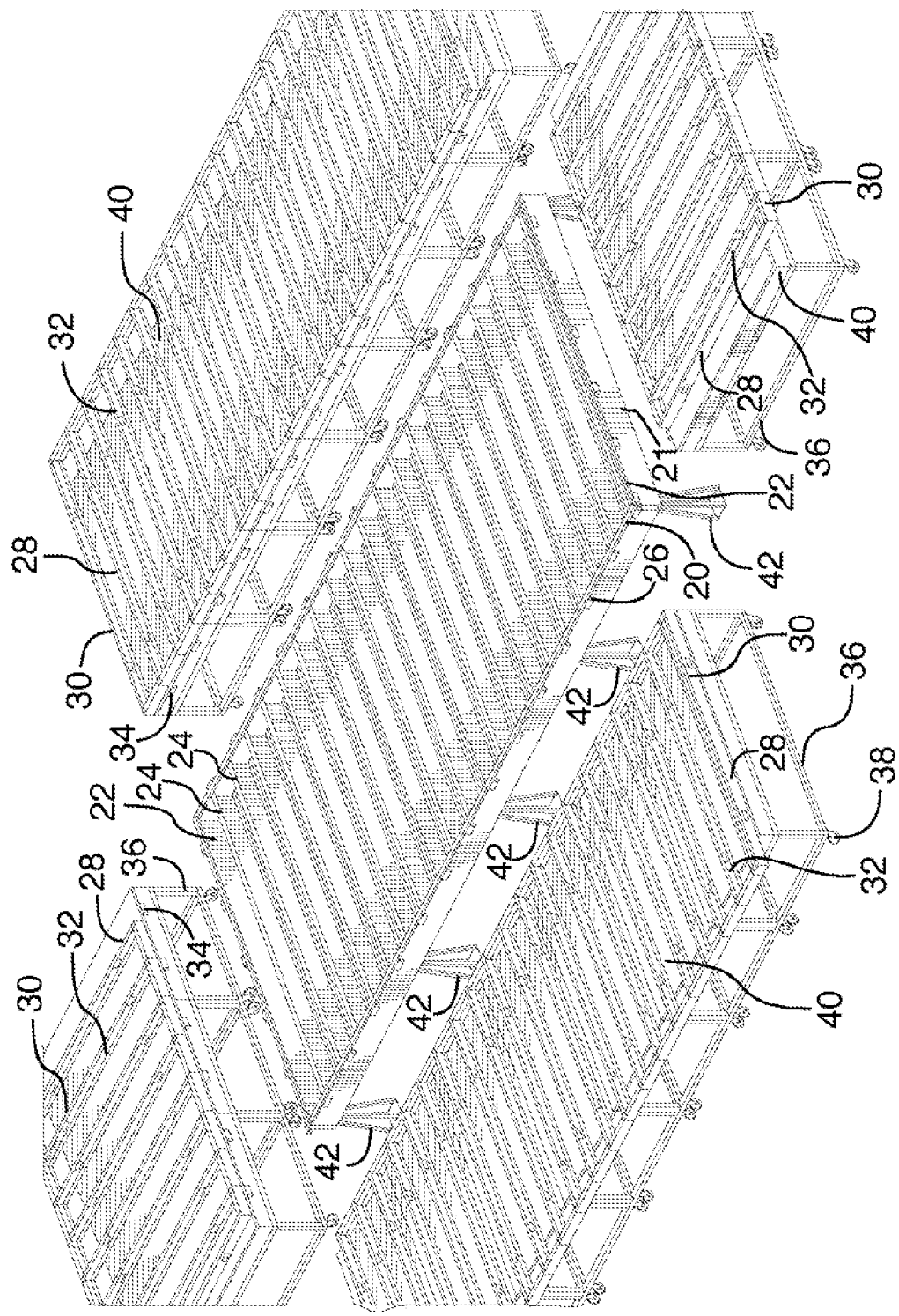
FIG. 1 shows a perspective view of the assembly system for modular building units. Shown are building components (floor and walls) on modular support frames.
Figure 2:
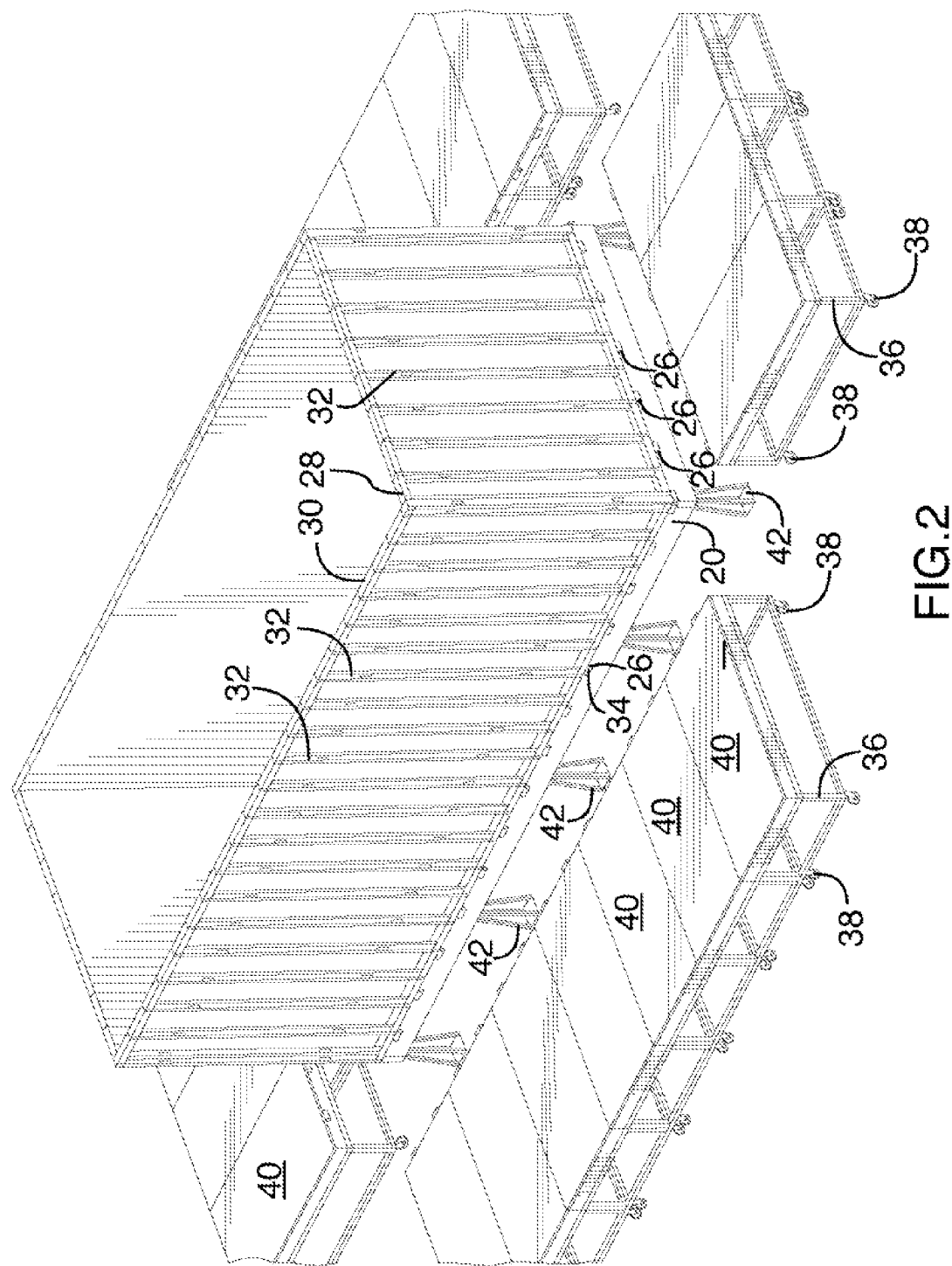
FIG. 2 shows a perspective view of the assembly system of FIG. 1, with the walls connected to the floor and post raised/upright (in the assembled configuration of walls being generally perpendicular to the floor).

Referring to FIGS. 1 and 2, the construction of a prefabricated structure according to the teachings of the present invention are illustrated. As shown in these figures, the floor 20 of the structure is assembled on a jig comprising floor platform 58. The floor 20 is assembled from an exterior frame 22 and reinforcing members or joists 24. Typically, the joists 24 are located every 16 inches, and run longitudinally from one side of the frame 22 to its generally parallel opposing side. The joists 24 thus run parallel to the other two sides of the frame 22. Once the frame 22 is built, it is relatively easy to complete the floor, by, for example, fastening plywood to the frame to form a subfloor, then adding tile, carpeting, or hardwood slats to the plywood using traditional building methods.

Floor frame platform 58 is mounted on floor support tables 42, which can be used to level the floor frame platform 58. The tables can also be used to hoist the entire prefabricated structure off the floor frame platform 58 to make it easier to transport the prefabricated structure once assembled.

As can be seen in FIGS. 1 and 2, the floor 20 has hinge regions 26 situated at regular intervals along, and protruding from, the exterior top surface of the frame 22.

FIGS. 1 and 2 also show walls 28, which, similar to the floor exterior frame 22 comprise a wall frame 30 and wall reinforcing members or wall joists 32. As shown, the wall joists 32 are generally parallel, are fastened to the top and bottom sides of wall frame 30 and can be placed approximately every 16 inches. The wall joists 32 thus run longitudinally from the top of the wall 28 to the bottom, when the wall 28 is in an assembled position.

Similar to the floor 20, the internal, or top surface of walls 28 can be finished, for example, by fastening drywall and primer and/or paint, or by fastening drywall and tiling, using traditional building methods. One advantage of the construction method shown is that, if desired, the internal surface of the walls 28 can be finished before the walls 28 are assembled to the floor 20. For certain wall treatments, for example, application of drywall, application of wallpaper, or application of tiles, the amount of labour can be decreased, and the accuracy of the work can be greatly improved by fastening the finishing surface while the wall 28 is still in a horizontal position.

Walls 28 also comprise hinge region 34 on the upper edge of one of the sides of wall frame 30, specifically, the side that will become the lower edge of the wall 28 when the wall is assembled into a prefabricated structure. As will be described in greater detail below, the hinge region 34 is complimentary to the floor hinge region 26.

During fabrication, walls 28 are assembled on wall support frames 36, each having wheels 38 and a wall support frame platform 40. As more easily seen in FIG. 2, wall support frame 36 is modular in nature, such that a plurality of wall support frames 36 are placed in proximity to one another to support one wall 28. In this manner, the wall support frames 36 are easily storable, movable, and by combining different numbers of wall support frames 36, can be used to manufacture walls of varied lengths. Note that wall support frames may have leveling structures (not shown), but do not necessarily require floor support tables, as shown and described for the floor platform 58.

Floor support tables 42 have mechanisms such as pistons 64 for raising and lowering the floor 20 from the floor platform 58; this makes it easier to transport the fabricated structure, for example, by sliding a forklift fork between the floor 20 and the floor platform 58. Floor support tables 42 also comprise floor levelers 66 for easily adjusting the height of the floor 20 relative to the ground when joining floor hinge region 26 with wall hinge region 34. This is useful in part since, often, once fabricated, the walls 28 and floor 20 aren't always perfectly level. Since both structures have some amount of flexibility, fine adjustment of the floor height at various points on the contact between the floor 20 and the walls 28 is useful.

FIG. 1 shows the floor 20 and the walls 28 in the position in which they are manufactured. FIG. 2 shows the floor 20 and the walls 28 after they have been assembled to one another. Briefly, floor hinge regions 26 are connected to wall hinge regions 34. The walls are then lifted into a vertical position. The walls are then connected to one another, and (optionally, but typically), the hinge regions are removed and/or replaced by structural supports.

Figure 3:
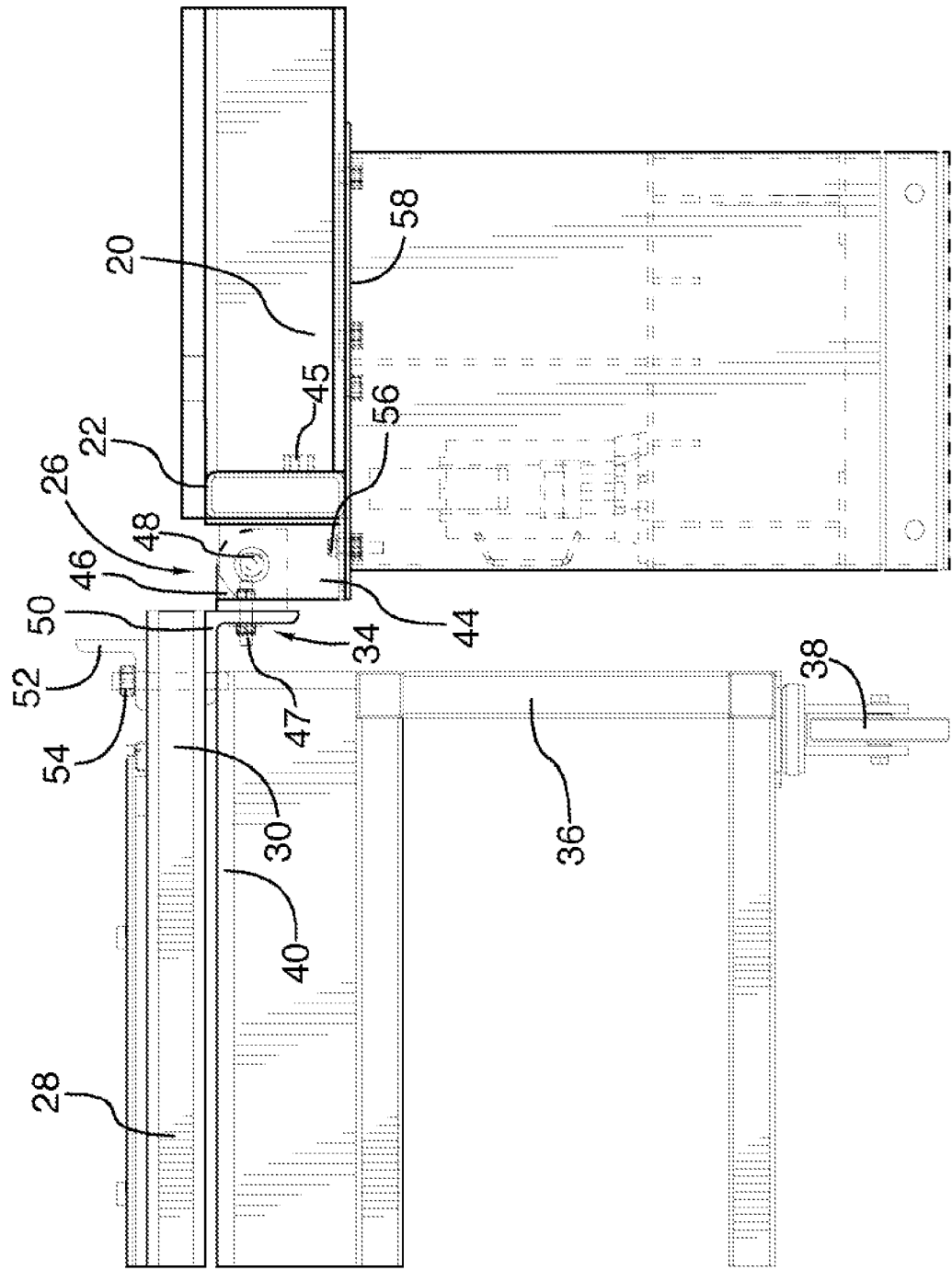
FIG. 3 shows a horizontal cross-section of the hinge region of the wall and floor of the assembly system, pre-"tip-up".
Figure 4:
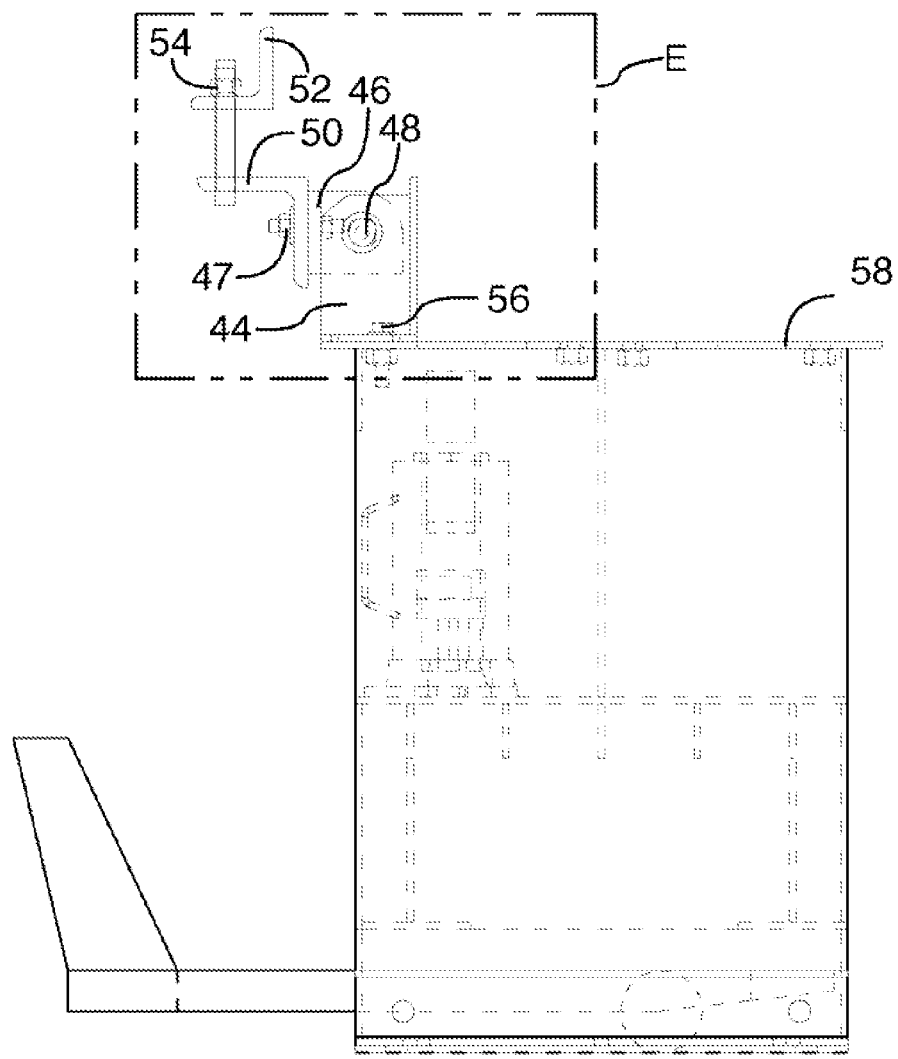
FIG. 4 shows the horizontal cross-section of the hinge region of FIG. 3, with the hinge region shown in isolation (with the floor and walls removed from the figure).
Figure 5:
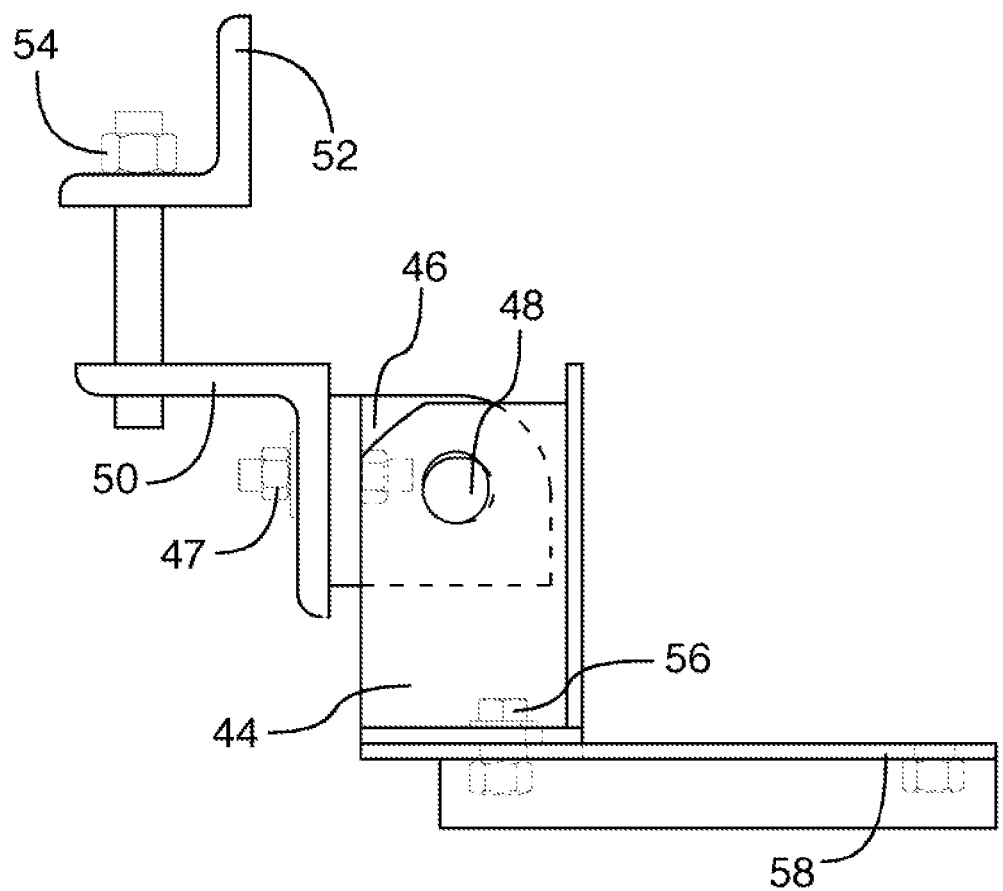
FIG. 5 shows a close-up of region E from FIG. 4.

FIGS. 3 and 4 show a horizontal cross-section of a floor 20 and wall 28, after respective hinge regions 26, 34 have been connected to one another, but before wall 28 has been raised. A close-up of region E from FIG. 4 is shown in FIG. 5. As can be seen, floor hinge region 26 comprises a hinge floor plate 44, which is fastened to floor frame 22 using floor plate anchor 45. Wall hinge region 34 comprises a hinge wall plate 46 connected to wall plate bracket 50 by wall plate anchor 47. Hinge bolt 48 is threaded through an aperture in both hinge floor plate 44 and hinge wall plate 46, to form a hinge. By the present invention, after assembly, the hinges can be removed from the walls and floor and reused. In the embodiments shown, multiple hinges are used for each wall, but it will be appreciated that for some constructions, a single hinge may be sufficient. Alternatively, a single hinge could be constructed to run the length of the wall edge.

Wall plate bracket 50 is connected to the wall frame 30 by stabilization bracket bolt 54, which also holds in place stabilization bracket 52, which is used to keep the wall in a vertical position once the wall is raised. Stabilization bracket 52 can, for example, be fastened to floor frame 22 when the wall is raised.

To add to the stability of the floor frame 22 during construction and to aid in safety during assembly, floor frame 22 may be fastened to floor platform 58 during construction (not shown). Optionally and as shown, this stability and safety can also be achieved by fastening hinge floor plate 44 to floor platform 58, utilizing floor platform bolt 56.

Figure 6:
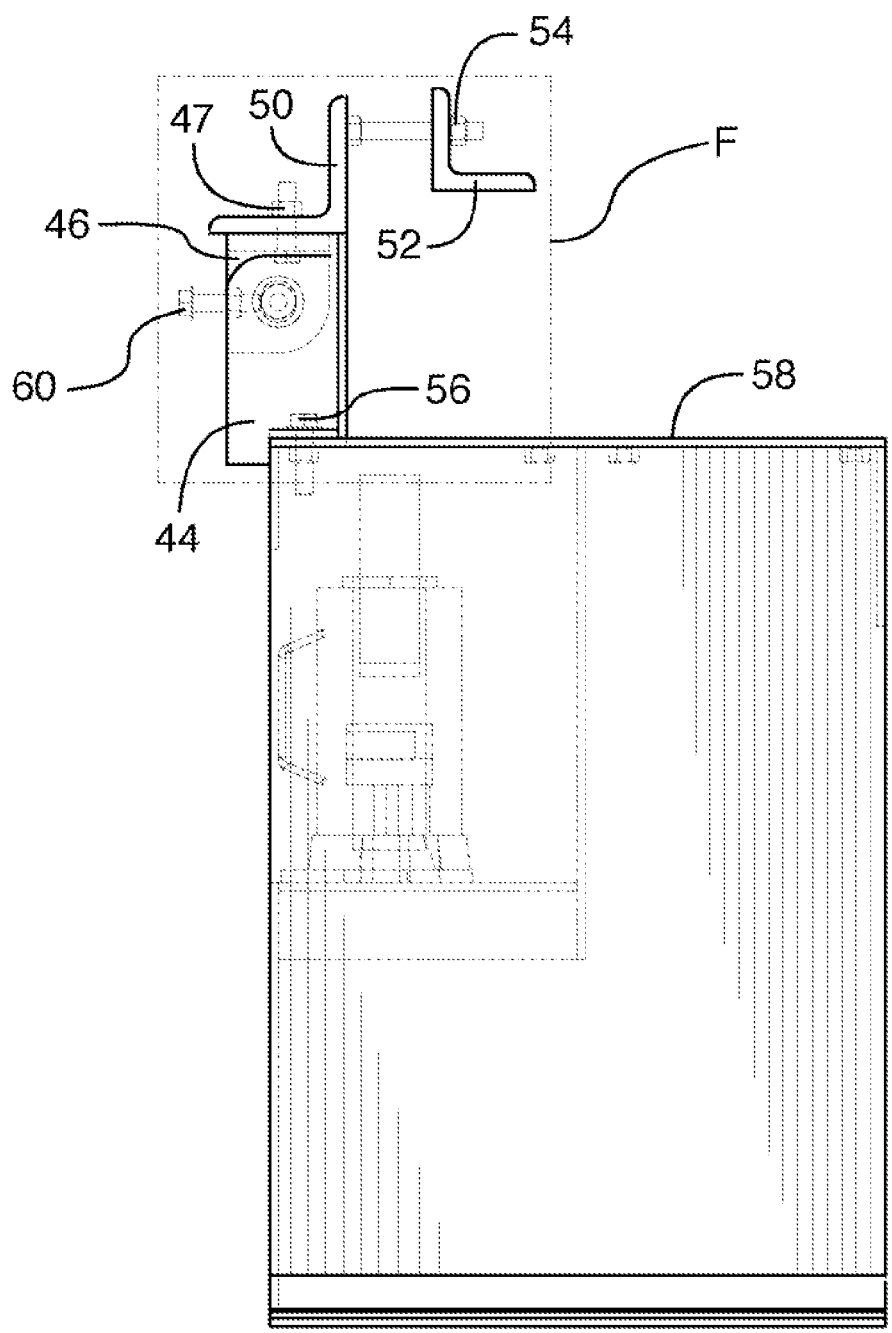
FIG. 6 shows a horizontal cross-section of the hinge region of FIG. 3, with the hinge region shown in isolation (with the floor and walls removed from the figure), post-"tip-up".
Figure 7:
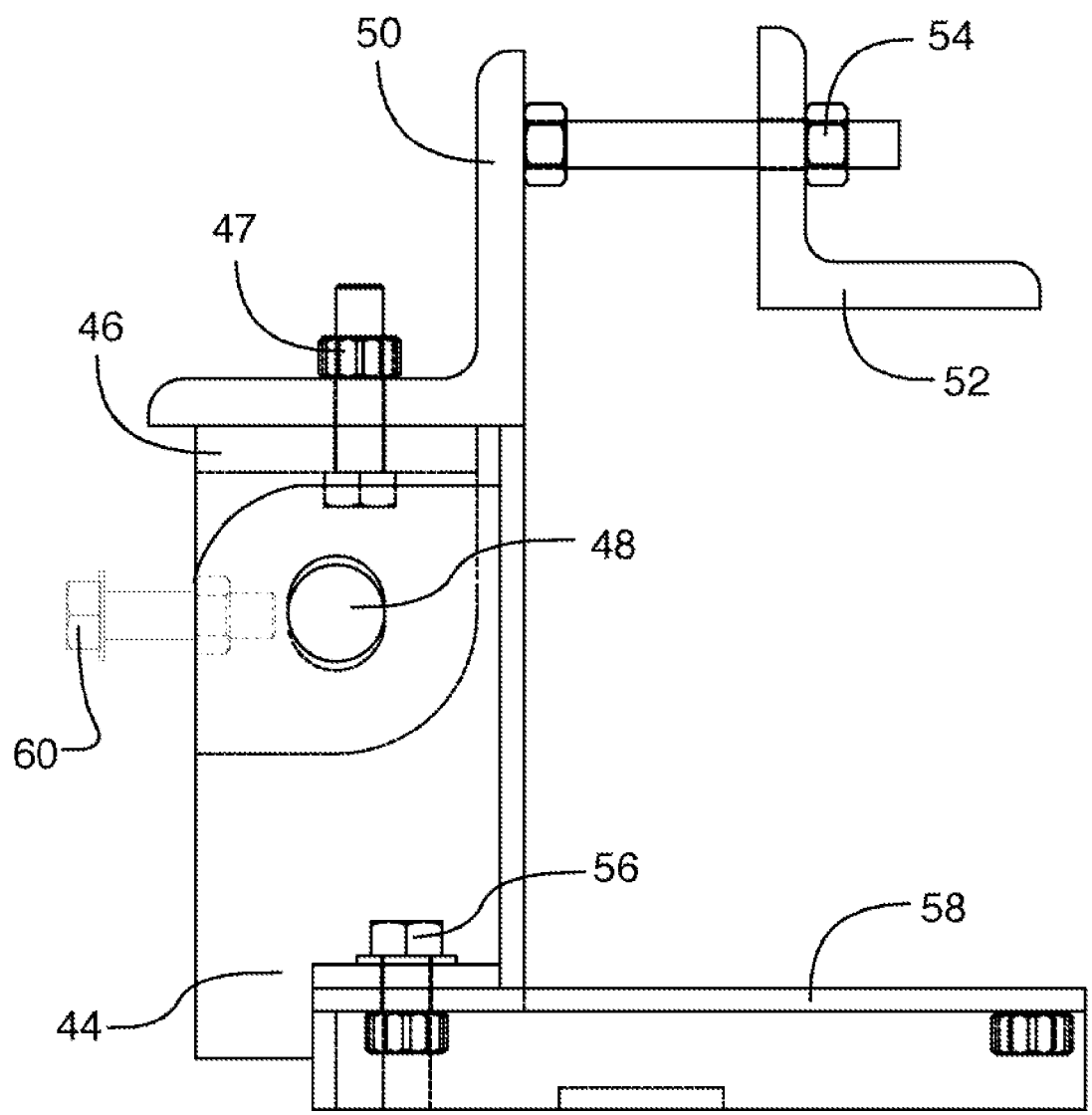
FIG. 7 shows a close-up of region F from FIG. 6.

FIG. 6 shows a horizontal cross-section of the hinge region 26, 34 as it would appear once the wall 28 has been raised, and in isolation (floor 20 and wall 28 are not shown). FIG. 7 shows a close-up of region F from FIG. 6. As can be seen, when the wall has been raised, stabilization bracket 52 is located proximal to the top surface of the floor 20, and can be fastened, if desired, to, for example, a floor surface mounted on the floor 20. Alternatively, once the wall has been placed in position, it can be fastened to the floor using conventional means, and the hinge region 26, 34 can be removed altogether.

Since the hinge region 26, 34 can be fastened to the floor platform 58, one method of manufacturing the floor 20 is to fasten the hinge region 26 first, then build the floor frame 22 onto the hinge region 26. This creates a metal "frame" for the floor frame 22, which is typically made from metal or wood that is generally more flexible than the hinge region 26.

Figure 9:
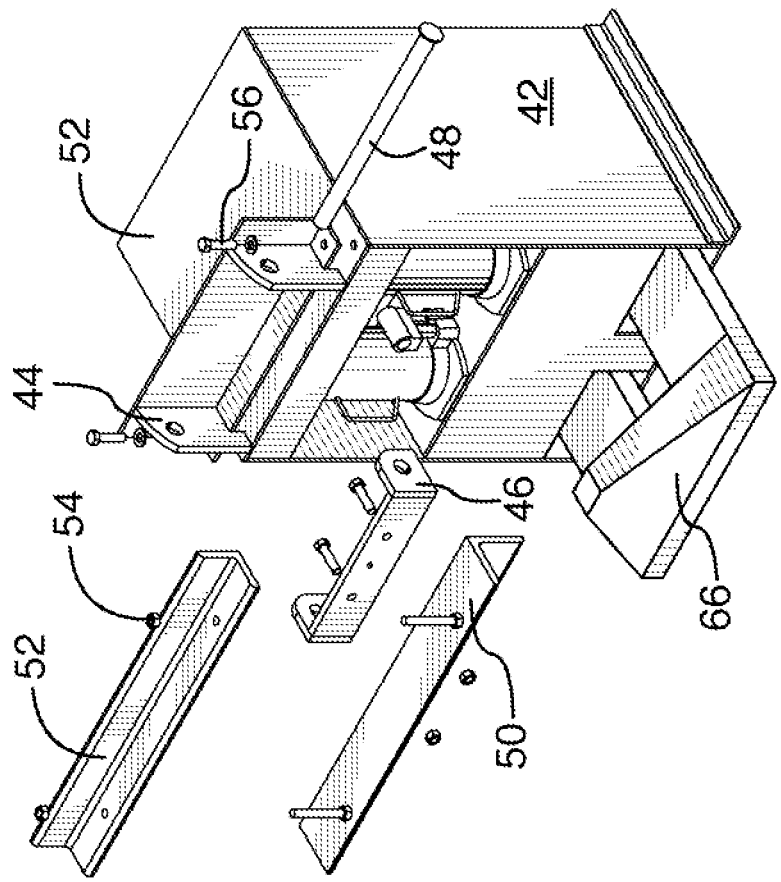
Figure 8:
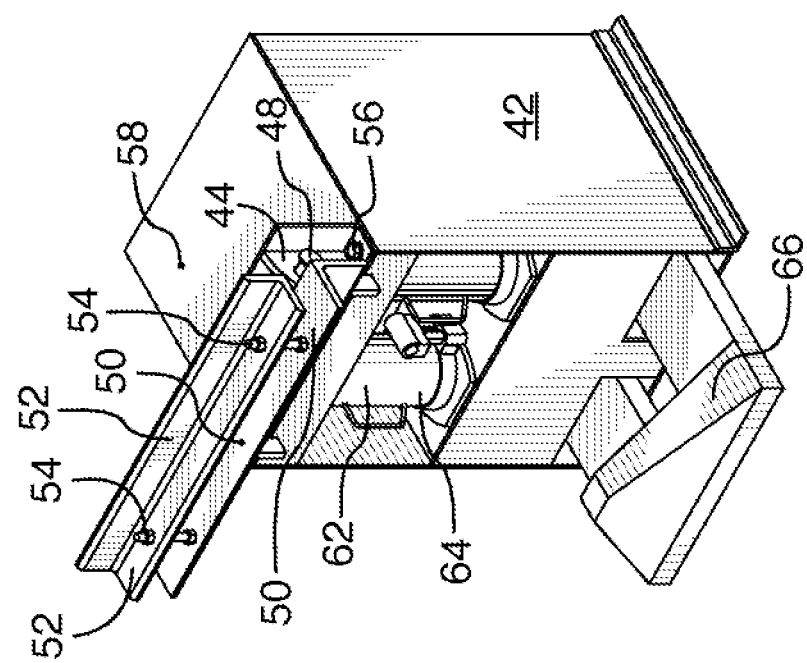
FIG. 8 shows a hinge region mounted to a jack stand/floor platform, in isolation.

FIG. 8 shows a perspective view of hinge region 26, 34 as mounted on floor platform 58. FIGS. 9-11 are similar views, with the hinge region 26, 34 shown in exploded view. As can be seen in this embodiment, floor support jack 42 can comprise piston 64 which can, be used to raise or lower floor 20 58 relative to the floor platform 58. This allows for the raising of the completed structure once fabricated, off of the floor platform 58, to facilitate moving of the structure to a desired installation location. Levelers 66 allow for fine tuning of the height of floor frame 22 relative to the surface of the building in which the floor frame 22 is fabricated.

Figure 12:
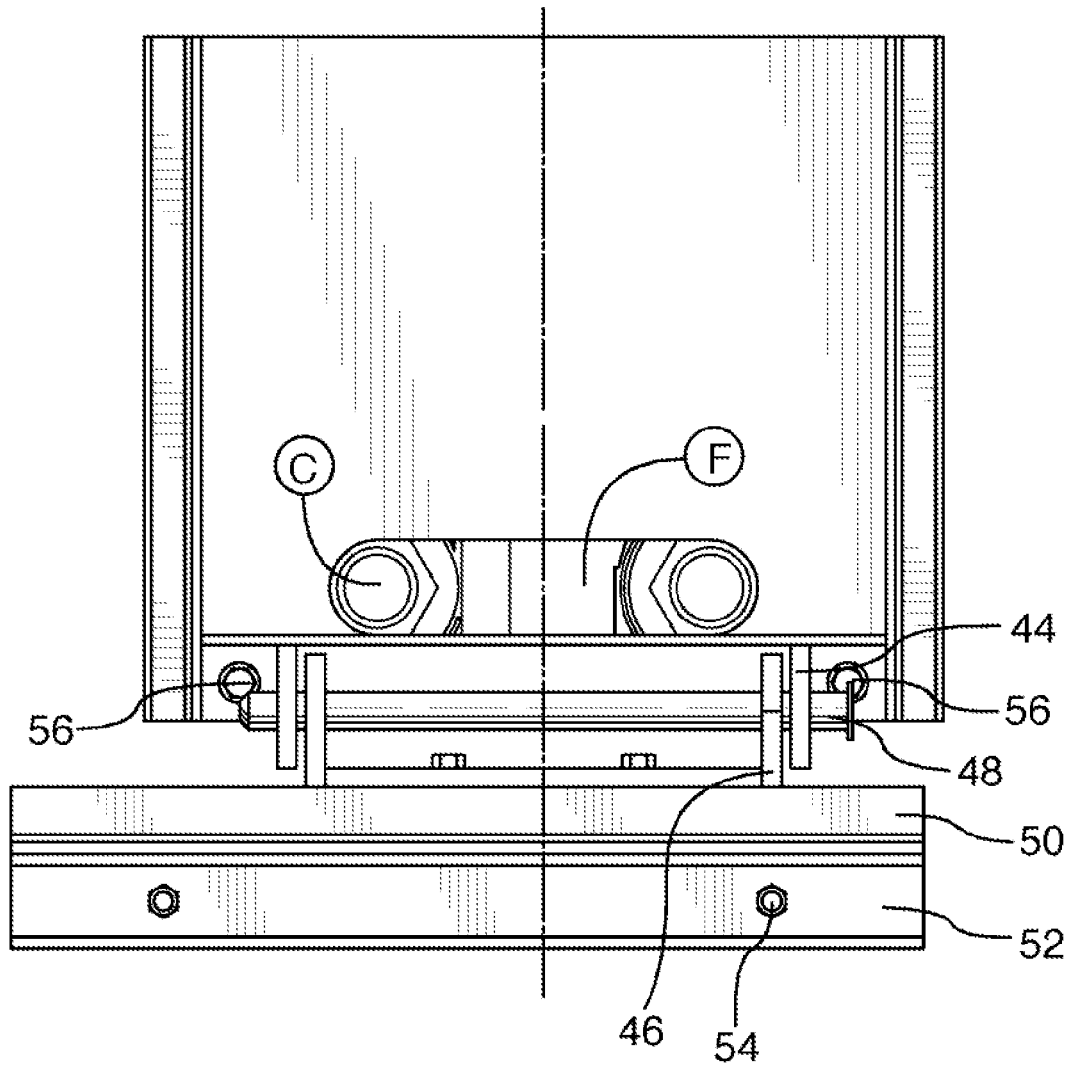
FIG. 12 shows a top plan view of the hinge region 26, 34.

FIG. 12 shows a top plan view of the hinge region 26, 34.

Thus, the floor support frame, comprising the floor support tables 42 and the floor platform 58, and the wall support frames 36 provide accurate positioning of the floor frame 22 and the wall frames 30, both absolutely and in relation to one another. The hinge regions 26, 34, which can be temporarily fastened to the floor platform 58 allows for the temporary rigidification, locating and hinging of the floor frame 22 to the walls 28, which prevents flexing of the wall during the vertical positioning of the wall (the "tilt-up" process). It also allows for an easy and accurate placing of the walls into position, in relation to adjacent walls and to the floor.

Figure 13:
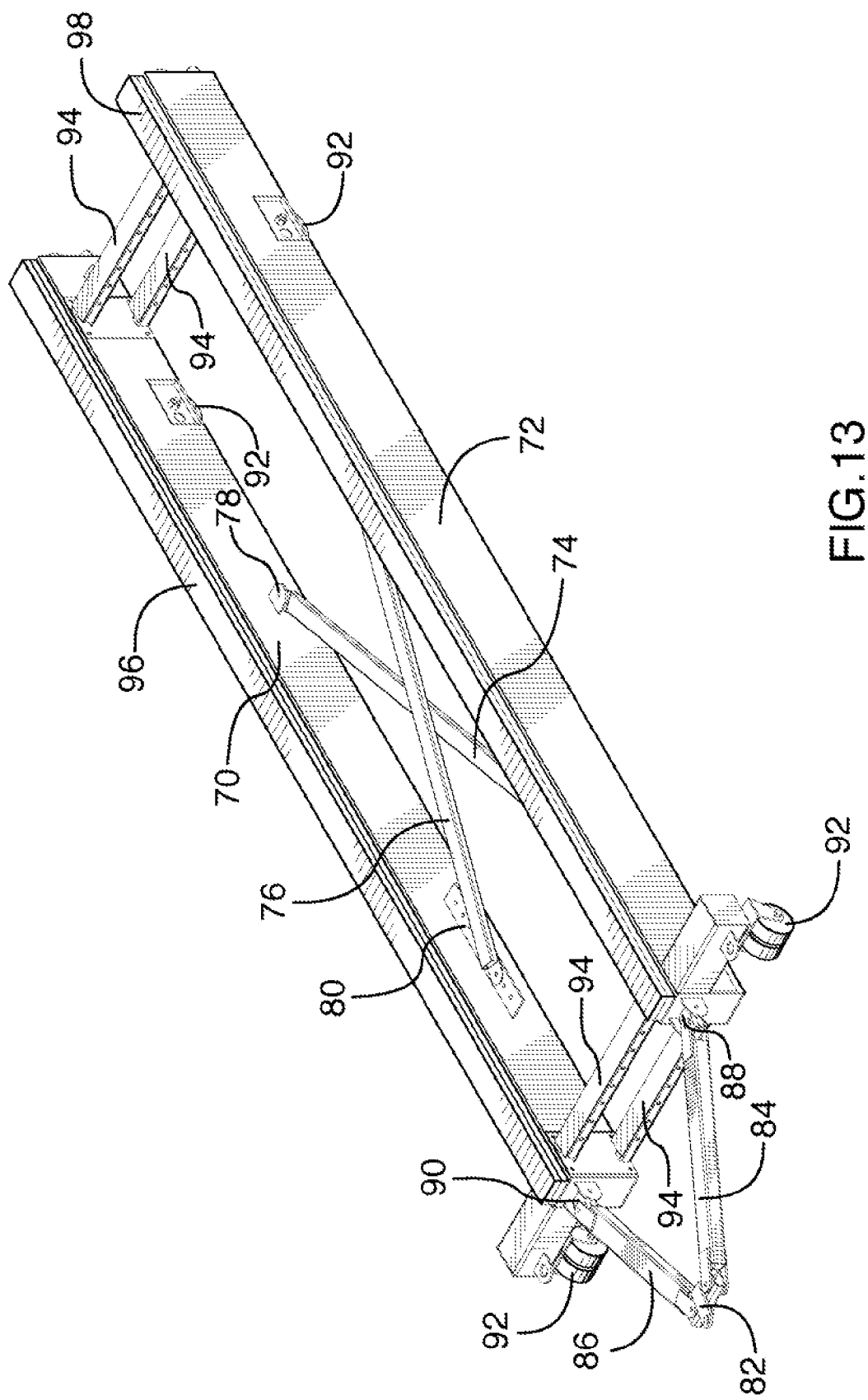
FIG. 13 shows the wagon in isolation.
Figure 14:
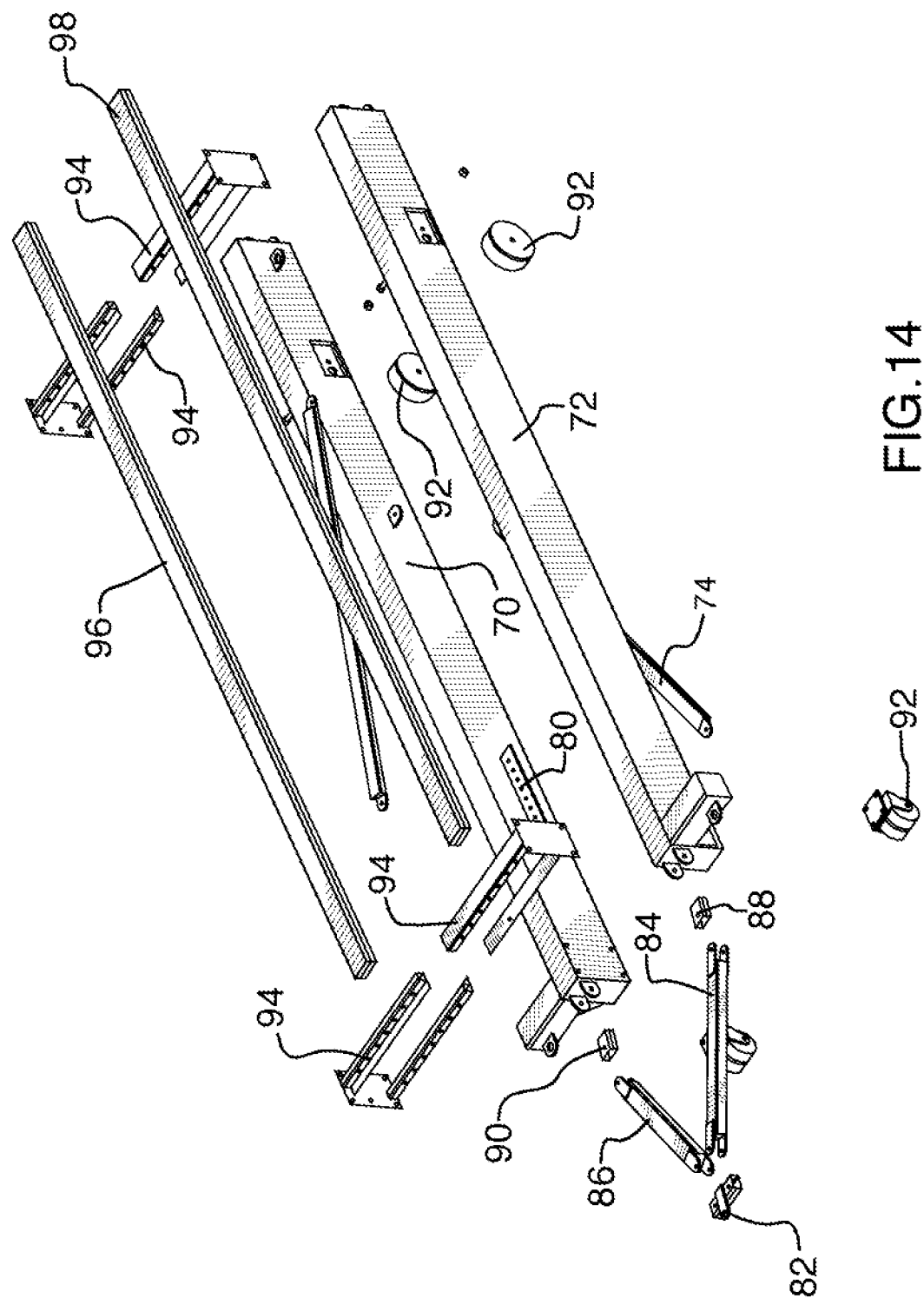
FIG. 14 shows an exploded view of the wagon of FIG. 13.

A further aspect of the invention can be seen in FIGS. 13-14. FIG. 13 shows transfer wagon 68 in isolation; with FIG. 14 showing transfer wagon 68 in exploded view. Building components are not shown, with only the modular support frames shown. Shown are wall support frames 36, each having wheels 38 and a wall support frame platform 40. Wall support frame 36 is modular in nature to facilitate assembly of walls of different lengths. Floor support tables 42 are also shown, and, as shown, have affixed to them stabilization brackets 52 and wall plate brackets 50, as described in previous figures. Also shown is transfer wagon 68 comprising longitudinal beams 70 and 72, which provide a frame support for floor (see also FIGS. 15 and 16). Floors of varied width can be accommodated by adjusting bracing 74, 76 to adjust the distance between longitudinal beams 70, 72. Bracing 74, 76 pivot on beam adjuster hinge 78 when unfastened from beam adjuster fastener 80, and provide a rigid bracing when fastened. Longitudinal beams 70 and 72, which provide structural support for floor, have wood boards 96, 98 running along their length and serving as an interface between the transfer wagon 68 and the floor.

As described in previous figures, floor support tables 42 are capable of supporting the floor on their own, without the assistance of transfer wagon 68. As such, transfer wagon 68 can be rolled into place once a building structure has been assembled, on transfer wagon casters 92. Transfer wagon 68 comprises transfer hitch 82 which is capable of being attached to a truck or other motorized vehicle for rapid and convenient displacement of transfer wagon 68. Transfer hitch 82 is connected to the transfer wagon 68 through transfer pull bars 84, 86 which are fastened to the transfer wagon 68 through hinge 88, 90.

Figure 15:
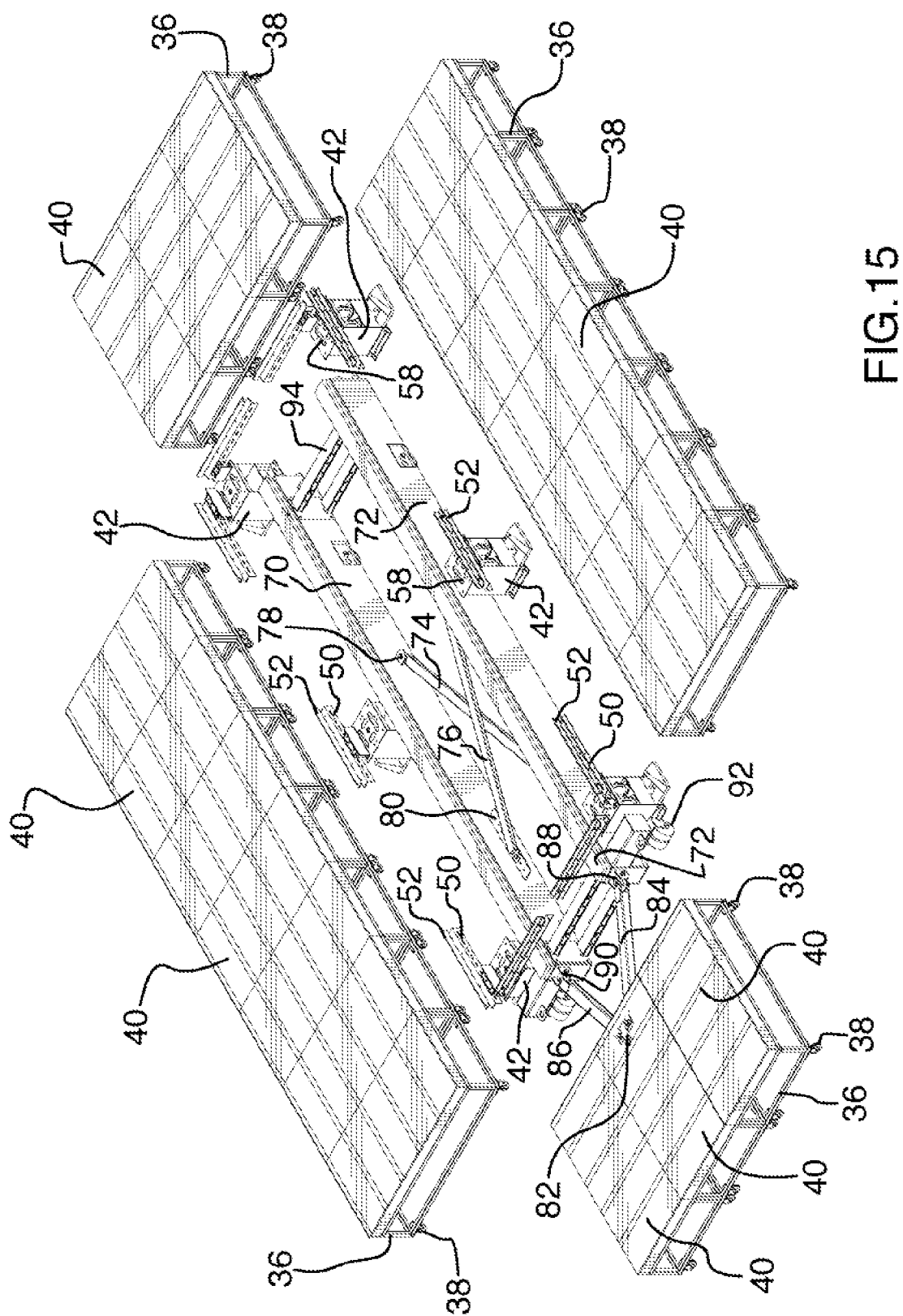
Figure 16:
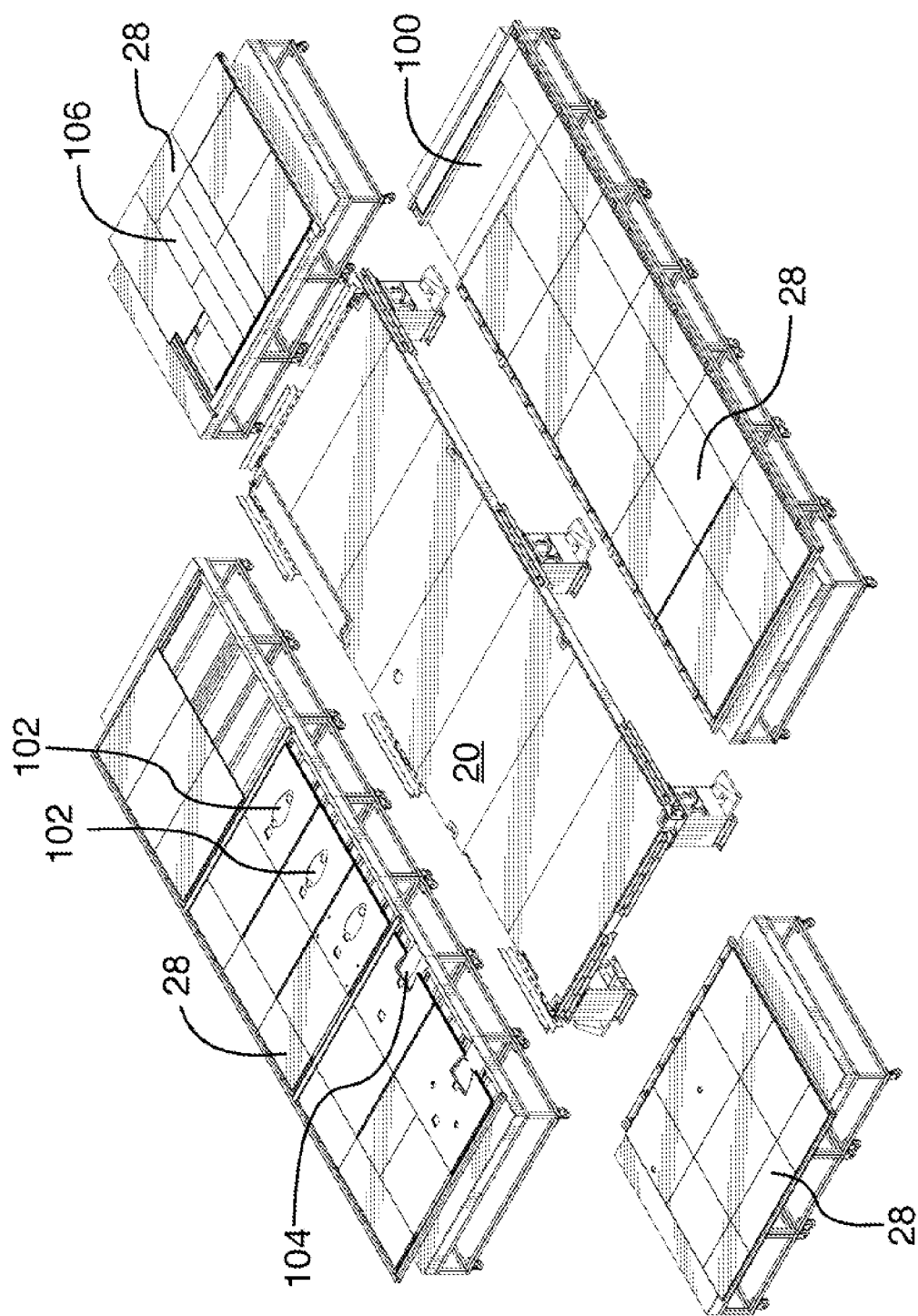
Figure 17:
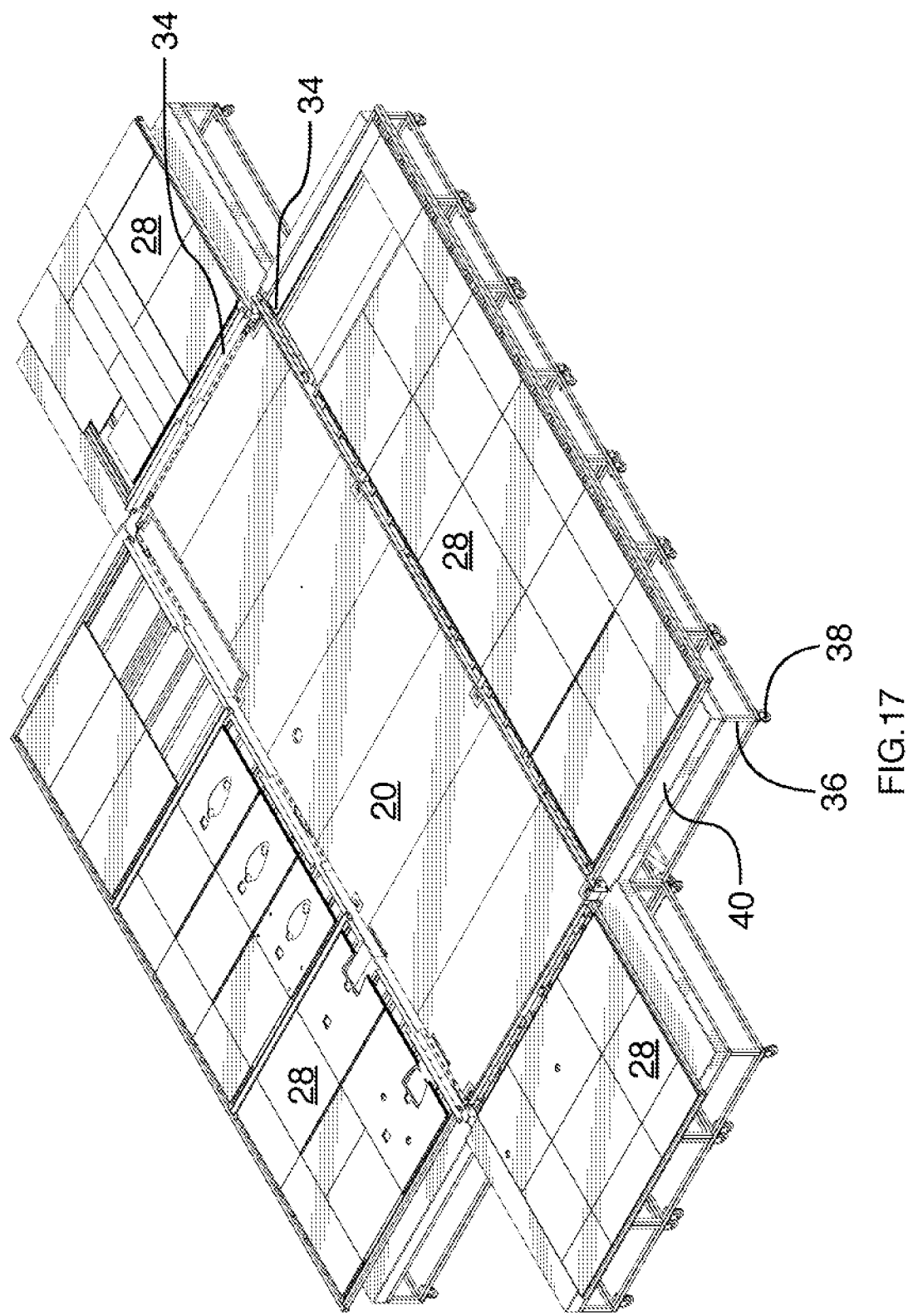
Figure 18:
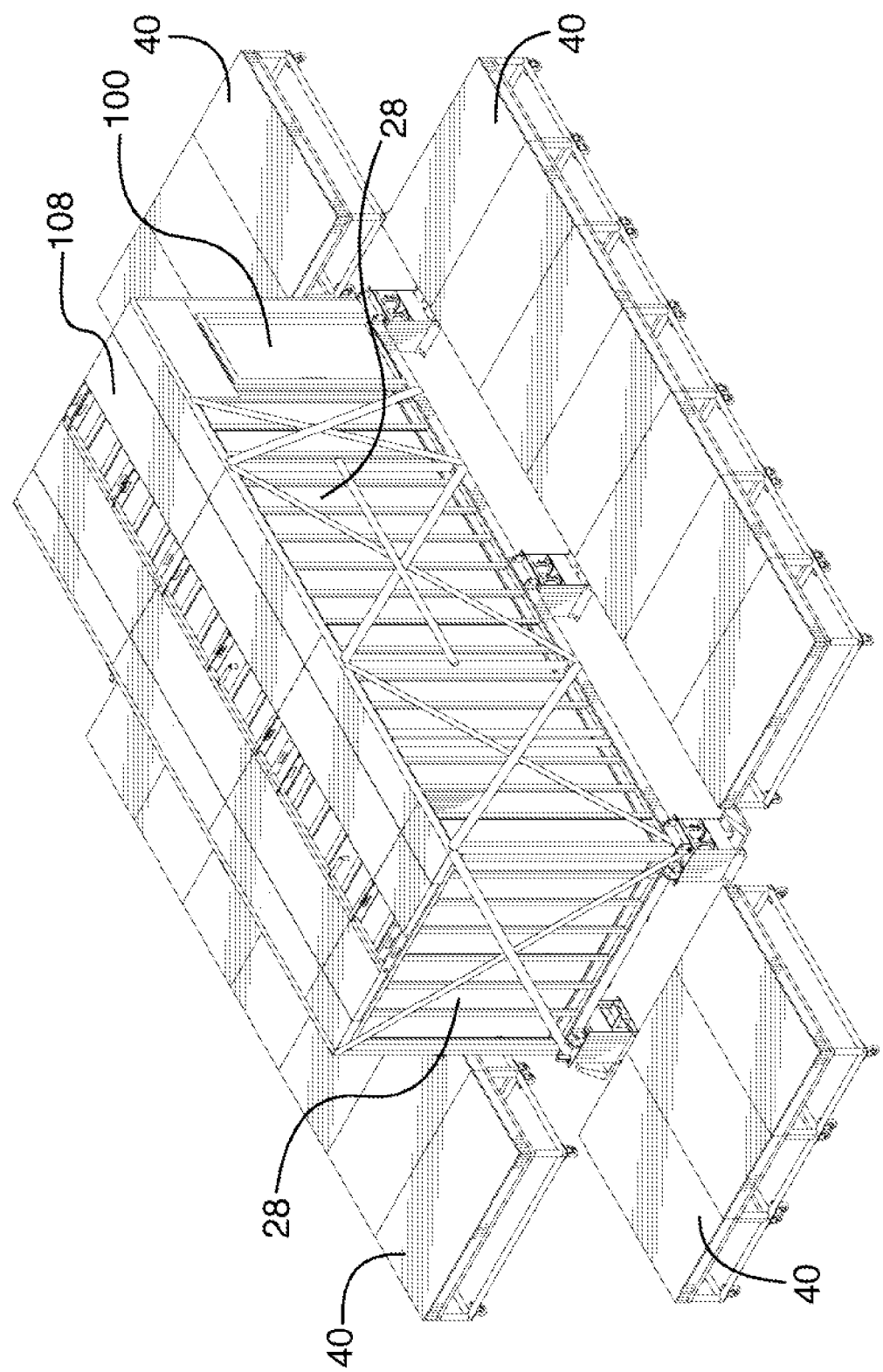
Figure 19:
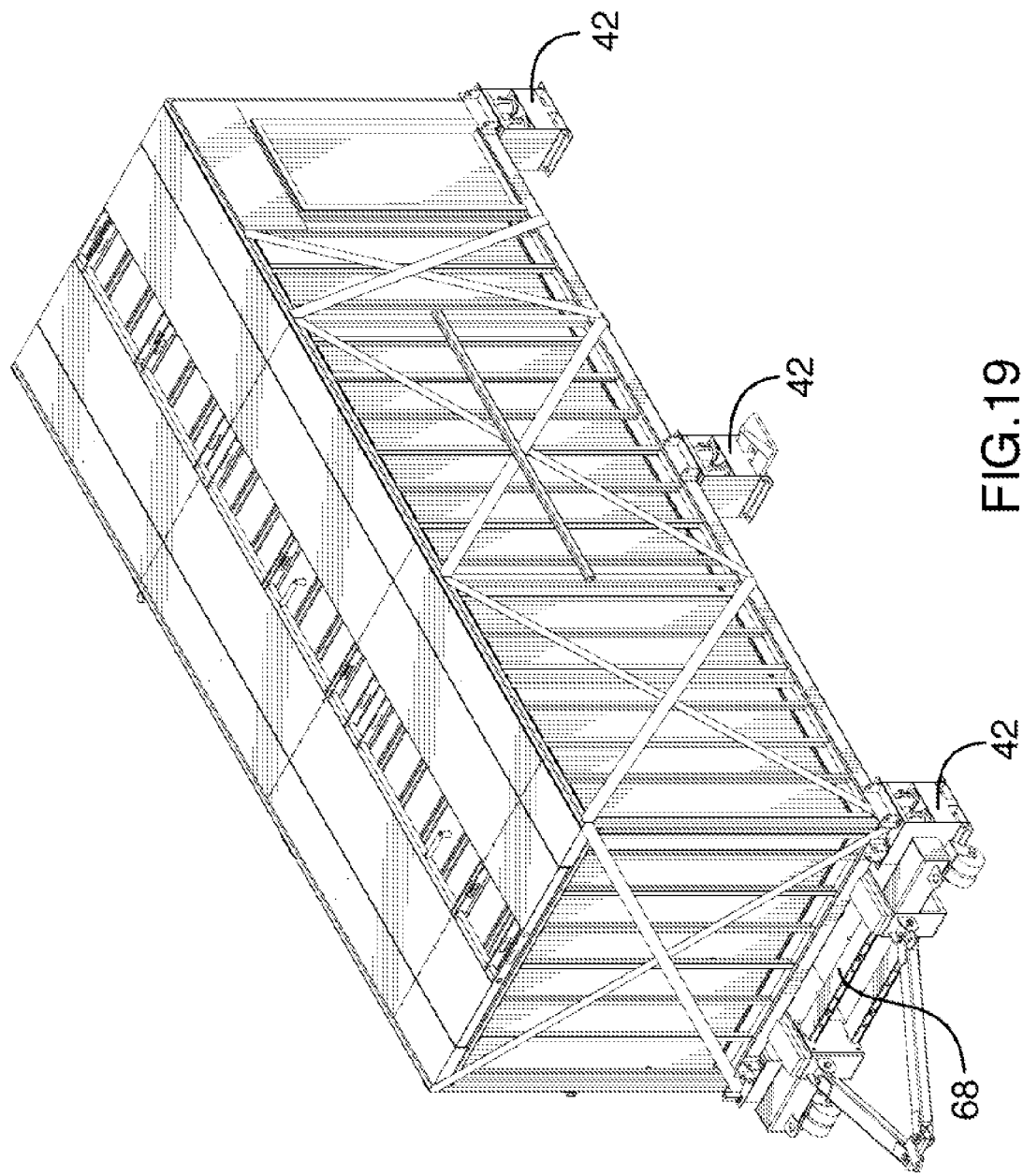

FIGS. 15-20 show the steps of the method in operation. In FIG. 15, the floor support tables 42 are placed at an appropriate distance from each other to support a floor of desired dimensions. Wall support frames 36 are also assembled together to support walls of desired dimensions. As shown in FIG. 20, the walls 28 and floor 20 are then assembled on the wall support frames 36 and floor support tables 42, respectively. As can be seen, the pre-fabricated structure can be built with desired elements already in place, for example, a door frame aperture 100, urinal apertures 102, and toilet apertures 104, pre-designed and configured for the ready receipt of a door (not shown), a urinal (not shown) or a toilet (not shown). Although these desired elements could also be fitted in the disassembled state, as shown, they are not. The pre-fabricated structure can also be built with desired finishes already installed, for example, decorative tiles 106. Once the floor 20 and walls 28 are assembled, as shown in FIG. 21, the walls 28 are rolled towards the edges of the floor 20, and affixed to the wall hinge region 34. The walls are then lifted up off of the wall support frames 36, into a vertical position, and affixed to one another and rigidly affixed to the floor 20. Optionally, and as shown in FIG. 18, a ceiling structure 108 can be affixed to the top edges of the walls 28. As previously described, optionally, the hinge regions can now be removed, since they are no longer structurally required. As shown in FIG. 19, the wall support frames 36 can then be wheeled away, and the transfer wagon 68 can be placed under the prefabricated structure. Floor support jack 42 is then lowered, thus lowering the assembled, pre-fabricated structure onto the transfer wagon 68, which, as shown in FIG. 20, can be wheeled away to a desired location.

It can be appreciated that various aspects or components have been described as systems but may be similarly implemented as methods, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

ELEMENT LIST

20 Floor
22 floor frame
24 floor joist
26 floor hinge region
28 wall
30 wall frame
32 wall joist
34 wall hinge region
36 wall support frame
38 wheel
40 wall support frame platform
42 floor support jack
44 hinge floor plate
45 floor plate anchor
46 hinge wall plate
47 wall plate anchor
48 hinge bolt
50 wall plate bracket
52 stabilization bracket
54 stabilization bracket bolt
56 floor platform bolt
58 floor platform
60 element
62 piston housing
64 piston
66 floor leveler
68 transfer wagon
70 longitudinal beam
72 longitudinal beam
74 bracing
76 bracing
78 beam adjustment hinge
80 beam adjustment fastener
82 transfer hitch
84 transfer pull bar
86 transfer pull bar
88 transfer hitch hinge
90 transfer hitch hinge
92 transfer wagon caster
94 transfer bridge
96 wood block
98 wood block
100 door frame aperture
102 urinal aperture
104 toilet aperture
106 decorative tiles
108 ceiling

What is claimed is:

1. An assembly system for modular building units having a floor and a plurality of walls, said assembly system comprising:
a floor platform, capable of supporting the floor and distinct from the floor;
a plurality of wall platforms, each capable of supporting one of the plurality of walls, and located distal to the floor platform; and
a plurality of hinge assemblies, each having a first end and a second end, each of said ends rotatable around a hinge spaced apart from and external to said floor and said plurality of walls, said first end having a floor plate, said second end having a wall plate, said floor plate being releasably attached to the floor platform, and said wall plate being releasably attached to one of the plurality of walls, said hinge assemblies rotatable about said hinge to at least a first position and a second position when attached to said floor platform and said one of the plurality of walls,
wherein, in said first position, the wall and the floor are generally parallel, and in said second position, the wall and the floor are generally perpendicular;
wherein, in use, the hinge assemblies can be rotated about said hinge from the first position to the second position by moving the walls in an upwards direction relative to the floor, such that when the wall is rotated onto the floor, the wall rests on the floor.

2. The assembly system of claim 1 further comprising a plurality of floor leveling apparatus capable of raising and lowering the floor platform relative to a surface on which the floor platform is situated.

3. The assembly system of claim 1 further comprising a plurality of pistons each driving a rod capable of displacing the floor relative to the floor platform when the floor is positioned on the floor platform.

4. The assembly system of claim 3 wherein the floor platform comprises a plurality of leveling tables having top surfaces.

5. The assembly system of claim 4 wherein said plurality of leveling tables contain a plurality of said pistons and said rods, and said rods extend through apertures in said top surfaces.

6. The assembly system of claim 1 further comprising wheels on said wall platforms.

7. The assembly system of claim 1 further comprising a plurality of hinge assemblies for each of said plurality of walls.

8. The assembly system of claim 1 wherein said hinge assemblies can be removed from the walls and the floor after assembly without affecting the integrity of the pre-fabricated modular building unit, and are reusable.

\* \* \* \* \*